United States Patent [19]

Bykhovsky et al.

[11] 4,119,828
[45] Oct. 10, 1978

[54] METHOD OF PLASMA MULTIARC WELDING BY PERMANENTLY BURNING DIRECT-CURRENT ARCS

[75] Inventors: David Grigorievich Bykhovsky; Arkady Leonidovich Bolotnikov; Gennady Egorovich Strepetov; Alexandr Ivanovich Danilov, all of Leningrad, U.S.S.R.

[73] Assignee: Vsesojuzny Nauchno-Issledovatelsky Proektno-Konstruktorsky i Tekhnologichesky Institut Elektrosvarochnogo Oborudovania, Leningrad, U.S.S.R.

[21] Appl. No.: 766,694

[22] Filed: Feb. 8, 1977

[51] Int. Cl.² ............................................. B23K 9/08
[52] U.S. Cl. .................................... 219/121 P; 219/75; 219/123; 219/124.1
[58] Field of Search ............ 219/121 P, 121 R, 125 R, 219/123, 74, 75; 313/231.3

[56] References Cited

U.S. PATENT DOCUMENTS

| | | | |
|---|---|---|---|
| 3,050,616 | 8/1962 | Gage | 219/121 P |
| 3,278,720 | 10/1966 | Dixon | 219/125 R X |
| 3,641,309 | 2/1972 | Klebel | 219/123 |
| 3,660,630 | 5/1972 | Sunnen et al. | 219/121 P X |

FOREIGN PATENT DOCUMENTS

| | | | |
|---|---|---|---|
| 2,448,620 | 5/1975 | Fed. Rep. of Germany | 219/121 P |
| 1,425,526 | 2/1976 | United Kingdom | 219/121 P |

OTHER PUBLICATIONS

"Methods of Controlling Arc Blow," by Holt, The Welding Engineer, 4-1931.

*Primary Examiner*—J. V. Truhe
*Assistant Examiner*—M. Paschall
*Attorney, Agent, or Firm*—Fleit & Jacobson

[57] ABSTRACT

A method of plasma multiarc welding by permanently burning direct-current arcs of different polarities makes use of a plasma forming gas and shielding mediums and the arcs are located so that the adjacent arcs have opposite polarities, consisting, according to the invention, in that all arcs are started between nonconsumable electrodes and a workpiece or some arcs are started between nonconsumable electrodes and a workpiece and other arcs are started between consumable electrodes and a workpiece, the currents of all arcs and the distance between the arcs being set so that the ratio of the product of the currents of two adjacent arcs to the distance therebetween is equal or more than $6.10^3$ $A^2/cm$.

24 Claims, 4 Drawing Figures

METHOD OF PLASMA MULTIARC WELDING BY PERMANENTLY BURNING DIRECT-CURRENT ARCS

This invention relates to plasma treatment of electrically conductive materials and, in particular, to a method of multiarc plasma welding of permanently burning directcurrent arcs of different polarities.

This invention can be employed for welding ferrous and non-ferrous metals in those branches of industry, where maximum speeds for the whole range of thickness cannot be realized by means of known processes of fusion arc welding. Besides, the invention can be employed in various branches of industry to manufacture metal constructions, as well as in some cases for heating and melting rapidly moving objects.

It is well known that single-arc processes are characterized by relatively low welding speeds. Here direct increase of the operating current of the electrode provides no proportional growth of the speed of welding. The melted metal is overheated and, consequently, arc power losses grow, weld formation deteriorates and its quality becomes significantly worse.

Higher speeds of welding accompanied by satisfactory weld formation and its good quality can be achieved by employment of multiarc systems making use of consumable or nonconsumable electrodes.

There is known a method of multiarc welding employing several consumable electrodes. The arcs have different polarities in order to exclude interference of two arcs burning next to each other, they are placed at such a distance as to prevent formation of a common welding bath.

Also known in the art is a method of multiarc welding by consumable electrodes, in which the distance between the electrodes is such as to unite the molten pools formed by separate arcs into a common welding pool. Flux is used as the shielding medium in this method of multiarc welding.

Multiarc welding methods using consumable electrodes are characterized by the following disadvantages: the amount of input thermal power and the melted filler material cannot be controlled separately and with large thicknesses, starting from 14-16 mm, the process of welding is performed on bevelled edges and the geometry of the weld seam cannot be controlled.

Known in the art is a method of multiarc welding by nonconsumable electrodes and unipolar arcs, which is realized only in case of special arc stabilization.

Arcs are stabilized by gas flows with light currents and with heavy currents they require magnetic stabilization.

In case the distance between nonconsumable electrodes is increased in order to exclude mutual interference of the arcs, the common pool breaks up and this method of welding becomes ineffective.

The known methods of multiarc welding by nonconsumable electrodes are characterized by the following basic disadvantages:

1. Operating currents and the range of welded thicknesses are limited because all known methods employ arcs of the same polarities.
2. The number of types of welded materials is limited because only inert gases can be employed as the shielding medium
3. Additional equipment is required for magnetic stabilization of arcs.

It is an object of this invention to eliminate the abovementioned disadvantages of the methods of multiarc welding by consumable and nonconsumable electrodes.

It is the main object of this invention to provide a method of multiarc plasma welding, wherein maximum speeds of welding are ensured as compared to all other known methods of arc welding.

Another object of the invention is to ensure maximum range of thicknesses without edge preparation.

Yet another object of the invention is to ensure minimum expenditure for 1 m of the weld seam.

Still another object of the invention is to provide a method which can be employed for all metals and alloys which can be welded by the heat of the electric arc.

These objects are achieved by that in a method of multiarc plasma welding by permanently burning direct-current arcs of different polarities making use of a plasma-forming gas and shielding mediums, the welded material is, according to the invention, heated by arcs started between nonconsumable electrodes and the workpiece or some arcs are started between nonconsumable electrodes and the workpiece and other electrodes are started between consumable electrodes and the workpiece, in this case the currents of all arcs and the distance between the arcs are set so that the ratio of the product of the currents of two adjacent arcs to the distance between their axes is equal to $\geq 6.10^3$. $A^2$/cm.

Molecular and inert gases and their mixtures can be employed in multiarc plasma welding by permanently burning direct-current arcs of different polarities as the plasma-forming gas. $CO_2$, $H_2$, $N_2$, $O_2$ are preferable as molecular gases.

Ar and He are preferable as inert gases.

$Ar+He$, $CO_2+Ar$, $Ar+N_2$, $Ar+O_2$ are preferable as plasmaforming mixtures.

The composition of the plasma-forming gas is dependent upon the composition of the welded material and the polarity of the nonconsumable electrode. If this nonconsumable electrode operates on direct current of the reversed polarity, molecular gases and their mixtures with inert gases are not recommended to be used as the plasma-forming gas.

In multiarc plasma welding by permanently burning direct-current arcs of different polarities employing molecular and inert gases or their mixtures as plasmaforming gases the common pool is protected by a gas medium or a layer of a flux.

Molecular and inert gases and their mixtures can be used as a shielding gas medium.

$CO_2$, $H_2$, $N_2$ and $O_2$ are preferably employed as molecular gases.

Ar and He are preferably employed as inert gases.

$CO_2+O_2$, $CO_2+Ar$, $Ar+He$, $Ar+O_2$ are preferable as shielding gas mixtures.

The composition of the shielding gas medium is determined by the composition of the welded and filler material.

All standard fluxes and pastes developed and used for submerged melt metal-arc welding, submerged melt welding by consumable and nonconsumable electrodes, gas-shielded welding by a nonconsumable electrode can be used as a shielding medium High silica manganic fluxes are recommended for welding of carbon and low-alloy steels, low silica fluxes are for welding of heavily alloyed steels and copper, and fluxes and pastes based on chlorous and fluorous lop salts.

In some cases a combined protection of the weld seam by fluxes and gas mediums simultaneously can be recommended.

The disclosed method of multiarc plasma welding ensures maximum efficiency as compared to all other methods of arc welding, better formation of the weld seam, as well as quality, stability, reliability throughout the operating current range.

The efficiency of the process in the disclosed method of plasma welding is ensured by independent adjustment of specific and common heat flows and the optimal distance between adjacent arcs of opposite polarities in conditions of a common molten pool.

Stability and reliability of the welding process throughout the whole range of operating currents is ensured by the ratio of the product of the currents of two adjacent arcs to the distance therebetween maintained within the limits $\geq 6.10^3 \text{ A}^2/\text{cm}$.

Electromagnetic interaction of arcs is compensated by alternating their polarity and employment of appropriate plasma-forming and shielding mediums.

When conditions of weld formation require no or an insignificant amount of a filler material, it is recommended to use a method of multiarc plasma welding by nonconsumable electrodes of different polarities, e.g. for welding of flanged edges.

When conditions of weld formation require a considerable amount of a filler material, it is recommended to use a method of multiarc plasma welding by some nonconsumable and some consumable electrodes, e.g. for bevel welding.

The filler material in the first and second instances can be identical in composition to the basic metal or different therefrom. The composition ofthe filler material depends on the technological and service characteristics of the weld seam.

The invention will now be described in greater deatil with reference to a specific embodiment thereof, taken in conjunction with the accompanying drawings, wherein.

The method of multiarc plasma welding using only nonconsumable electrodes exemplified by three-arc welding of steels consists in the following.

Figure 1:
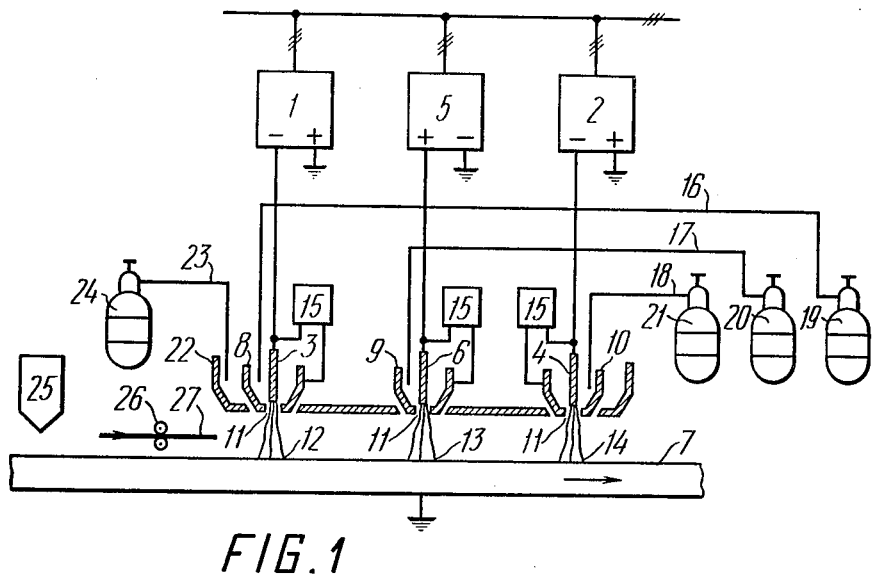
FIG. 1 shows a method of multiarc plasma welding using only nonconsumable electrodes exemplified by three-arc welding of steels, according to the invention.

Referring to FIG. 1, the negative poles of direct current sources 1 and 2 are connected to nonconsumable electrodes 3 and 4 respectively. The positive pole of a direct current source 5 is connected to a nonconsumable electrode 6. The nonconsumable electrodes 3, 4 and 6 are insulated from one another. The positive poles of the power sources 1 and 2 and the negative pole of the power source 5 is connected to a workpiece 7.

Plasma-forming nozzles 8, 9 and 10 provided with central channels 11 serve to stabilize arcs 12, 13 and 14.

The plasma-forming nozzles 8, 9 and 10 are insulated from one another. High-frequency dischargers 15 are connected to the nonconsumable electrodes 3, 4, 6 and the plasma-forming nozzles 8, 9 and 10 for contactless starting of welding arcs 12, 13, 14. The arcs 12, 13 and 14 are provided with individual passages 16, 17, 18, respectively, for supply of the plasma-forming gas from gas bottles 19, 20, 21. The shielding gas is fixed by a common shielding nozzle 22 and is supplied through a passage 23 from a cylinder 24. When flux is used as the shielding medium, it is supplied from a hopper 25 directly to the workpiece 7. If a filler material is used for welding, a feed mechanism 26 is provided to supply a filler material 27.

Welding is started in a definite sequence. The first to be initiated are the direct polarity arcs 12 and 14 which burn from the electrodes 3 and 4 to the workpiece 7. The initial current for each arc 12 and 14 is selected so as to ensure stable burning of the arcs the maximum deviation caused by electromagnetic interaction of electric arcs from the electrode axis being less than 7°.

With the same current the reversed polarity arc 13 is started and the three-arc system becomes electromagnetically balanced. The currents of the arcs 12, 13, 14 are raised to the operating level simultaneously. At the same time or with a certain delay they start to move with respect to the workpiece 7 at a welding speed, for example, in the direction opposite to that indicated by the arrow in FIG. 1.

It is possible that all welding arcs are started simultaneously. However, in this case electromagnetic interaction between the arcs increases and the premissible starting current of each arc should be lowered as compared to the previous stepwise starting of welding arcs, which deteriorates stability of plasma arc burning at light currents.

Welding by nonconsumable electrodes only is performed with or without a filler material depending on the requirements set for the welded joint. The filler material is not conductive. The filler material is melted directly in the burning zone of any of the welding arcs 12, 13, 14. The welding pool is protected by a shielding gas, flux, or a combination of the gas and flux.

The method of multiarc plasma welding using consumable and nonconsumable electrodes exemplified by three-arc welding of steels and copper consists in the following.

The negative poles of direct current sources 1 and 2 (FIG. 2) are connected to nonconsumable electrodes 3 and 4 respectively. The positive pole of the direct current source 5 is connected via a lead 28 to a consumable electrode 29 fed by a mechanism 30. The nonconsumable electrodes 3 and 4 and the consumable electrodes 29 are insulated from one another. The positive poles of the power sources 1 and 2 and the negative pole of the power source 5 are connected to a workpiece 31.

The plasma-forming nozzles 8 and 10 provided with central channels 11 serve to stabilize the arcs 12 and 14. A nozzle 32 serves to supply directly to the zone of burning of an arc 33 a gas different in its composition than the shielding gas for the arcs 12 and 14. The plasma-forming nozzles 8, 10 and the shielding nozzle 32 are insulated from one another. The high-frequency dischargers 15 are connected to the nonconsumable electrodes 3, 4 and the nozzles 8, 10, to the consumable electrodes 29 and the workpiece 31 for contactless initiation of the arcs 12, 14, 33.

The plasma arcs 12 and 14 feature individual channels 16 and 18, respectively, for supplying a plasma-forming gas from the bottles 21 and 19. The shielding gas is fixed by a common shielding nozzle 22 and supplied through a passage 23 from a gas cylinder 24. The shielding gas supplied directly to the zone of the consumable electrode 29 is fed through a passage 34 from a gas cylinder 35. In case the flux is used as the shielding medium, it is supplied from the hopper 25 directly to the workpiece 31.

Welding is started in a definite sequence. The first to be started are the direct polarity arcs 12 and 14 burning between the nonconsumable electrodes 3 and 4 to the workpiece 31. The initial current for the arcs 12 and 14 is selected so that the arcs are stable and electromagnetic interaction deviates the welding arcs from the axes of the electrodes 3 and 4 to less than 7°. The arc 33 is then started by means of a high-frequency discharge between the consumable electrode 29 and the workpiece 31 and the feed mechanism 30 of the consumable electrode 29 is switched on. Initiation of arcs by contacting the electrode and the workpiece is possible provided devices are used to limit the short-circuit current. After all arcs are initiated, the multiarc system is electromagnetically balanced and the current is increased to its operating value simultaneously on all arcs 12, 14 and 33. At the same time or with a certain delay they begin to move with respect to the workpiece 31 at a welding speed for example, in the direction opposite to the arrow of FIG. 2.

It is possible that all welding arcs 12, 14 and 33 are started simultaneously by the high-frequency dischargers 15. The arc 33 between the consumable electrode 29 and the workpiece 31 can be started by contacting the electrode and the workpiece only if a device is provided to limit the short-circuit current. However, in this embodiment electromagnetic interaction between the arcs increases and the permissible starting current of each arc is to be reduced as compared to the above described embodiment.

The embodiment, wherein the arc is first started between the consumable electrode and the workpiece, permits initiation of the welding arc by short circuit, but requires introduction of welding programming devices ensuring stable burning of the welding arc with light starting currents at the beginning of welding.

Figure 3:
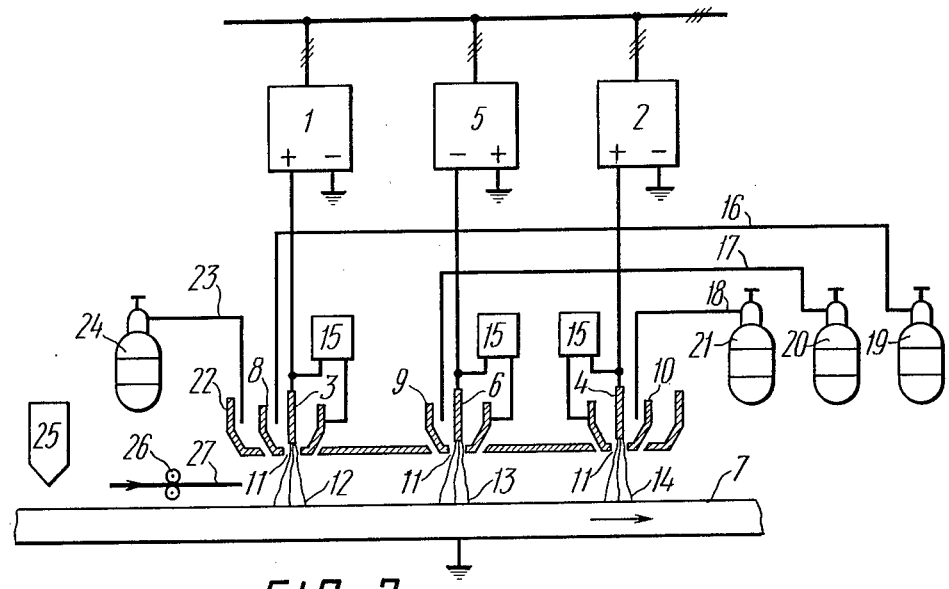
FIG. 3 shows a method of multiarc plasma welding using only nonconsumable electrodes exemplified by three-arc welding of aluminum and its alloys, according to the invention.

The method of multiarc plasma welding with nonconsumable electrodes only exemplified by three-arc welding of aluminum and its alloys is performed according to the circuit of FIG. 3 which is analogous to that of FIG. 1, the only difference being that in this case the positive poles of the direct current sources 1 and 2 are connected to the nonconsumable electrodes 3 and 4, respectively, the negative pole of the direct current source 5 is connected to the nonconsumable electrode 6, whereas the negative poles of the sources 1 and 2 and the positive pole of the source 5 are connected to the workpiece 7.

Figure 2:
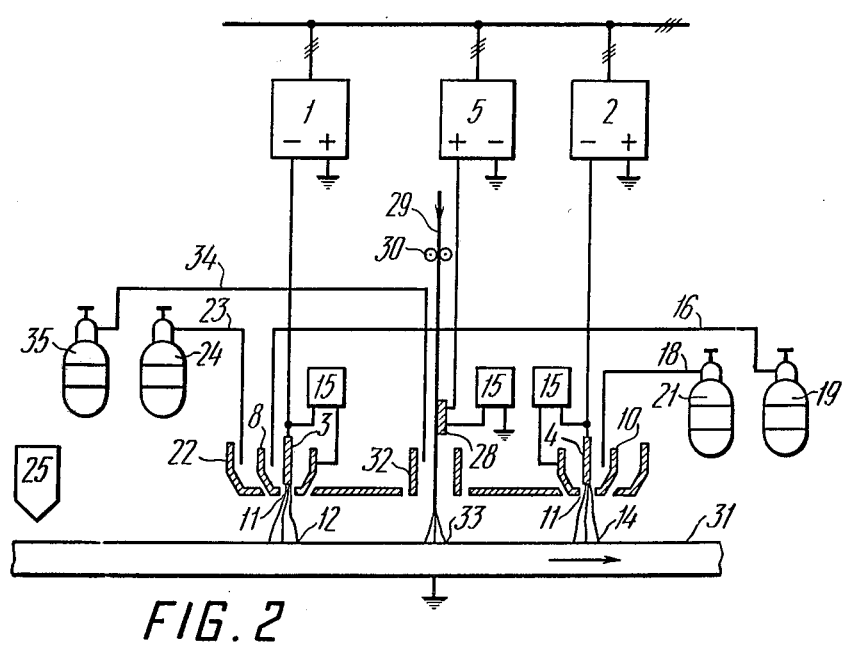
FIG. 2 shows a method of multiarc plasma welding using consumable and nonconsumable electrodes exemplified by three-arc welding of steels and copper, according to the invention.
Figure 4:
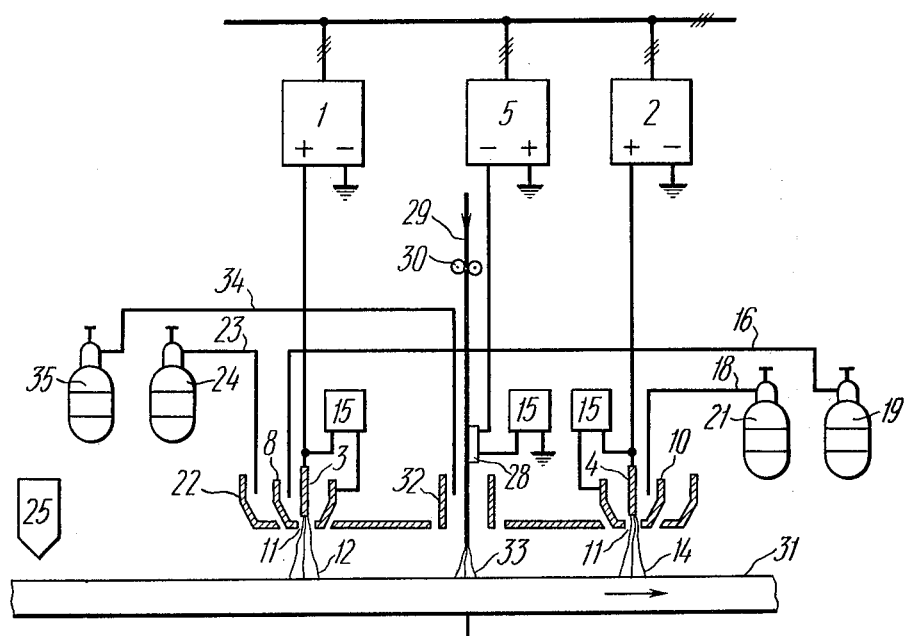
FIG. 4 shows a method of multiarc plasma welding using consumable and nonconsumable electrodes exemplified by three-arc welding of aluminum and its alloys, according to the invention.

The method of multiarc plasma welding with consumable and nonconsumable electrodes, exemplified by three-arc welding of aluminum and its alloys, is performed according to the circuit of FIG. 4 which is analogous to that of FIG. 2. In this case the polarity of the consumable and nonconsumable electrodes is also reversed.

A permanent welding pool is the indispensable requirement for realization of multiarc plasma welding by arcs of different polarities according to the above described examples.

In order to observe this condition, the arcs should be located fairly close to one another. In this case the ratio of the product of the currents of adjacent arcs to the distance therebetween should be $\geq 6.10^3 A^2/cm$, that is kept as $(I_1 \cdot I_2/e) = 6.10^3 A^2/cm$, where $I_1$ and $I_2$ are currents of adjacent arcs and 1 is the distance between the axes of the same arcs.

The value $6.10^3 A^2/cm$ is the minimum permissible value and is determined by perculiarities of welding of small thicknesses.

EXAMPLE I.

Welding of a quarter beam of two channels. Beam operational conditions require that one of butt joints is to be reinforced. The second butt joint can have no seam reinforcement. The joints re single-welded, one-pass and square butt. The welded material has the following composition, in percent: $C \leq 0.12$; $Si = 0.17-0.37$; $Mn = 1.4-1.80$; $Cr \leq 0.30$; $Ni \leq 0.30$ $Cu \leq 0.30$; $S = 0.04$; $P = 0.035$; the rest — Fe. The welded edges are 8 mm thick.

Welding of a joint without reinforcement is performed according to the circuit of FIG. 1 in conditions, when arcs of different polarities are started between nonconsumable electrodes and the workpiece. The number of nonconsumable electrodes is 3. The first and trailing arcs are of the straight polarity, whereas the middle arc is of the reversed polarity.

Carbon dioxide ($CO_2$) is used as the plasma-forming gas for the straight polarity arcs and argon (Ar) is used for the middle arc. Consumption of the $CO_2$ plasma-forming gas in the straight polarity arcs is equal to 260 l/min. The reverse polarity arc consumes 200 l/min of Ar plasma-forming gas.

Carbon dioxide ($CO_2$) is used as the shielding medium. Consumption of the $CO_2$ shielding gas amounts to 2,000 l/hr. It is possible that flux is used as the shielding medium of the following or analogous composition in %:

$SiO_2 = 41.0-44.0$; $MnO = 34.0-38.0$; $CaO \leq 6.5$; $MgO = 5.0-7.5$ $A_2O_3 \leq 4.5$; $CaF_2 = 4.0-5.5$; $Fe_2O_3 < 2.0$; $S < 0.15$; $P < 0.12$.

Employment of flux makes the weld appearance better.

The operating current of the straight polarity first arc is equal to 1,150 A, the operating current of the straight polarity trailing arc is equal to 980 A, the operating current of the reversed polarity middle arc is equal to 780 A.

The distance between the axes of the straight and reversed polarity arcs amounts to 37 mm. The lesser ratio of the product of the currents of two adjacent arcs to the distance between their axes is $2.07 \cdot 10^5 A^2/cm$.

The speed of welding is 390 m/hr. Slag removal and the appearance of the weld are improved by using a mixture $CO_{2+}O_2$ as the plasma-forming gas for the straight polarity arcs. Other parameters of welding remain unchanged.

The welded joint is formed by melting the welded material. In order to compensate for metal and other losses it is possible to supply the filler material of the following composition, in percent:

$C = 0.05-0.11$; $Mn = 1.80-2.10$; $Si = 0.7-0.95$; $Cr \leq 0.20$; $Ni \leq 0.25$; $S < 0.025$; $P < 0.030$; the rest — Fe.

Welding of a reinforced butt joint is realized according to the circuit of FIG. 2 and is performed in conditions, when arcs of different polarities are started between nonconsumable electrodes and the workpiece (beam) and between the consumable electrode and the workpiece (beam). There are two nonconsumable electrodes and one consumable electrode. The arcs between the nonconsumable electrodes and the workpiece are of the straight polarity and the arc between the consumable electrode and the workpiece is of the reversed polarity. Compositions and expenditures of the plasma-forming gas and the shielding mediums are like those for welding of the unreinforced butt joint.

The diameter of the consumable electrode is 3 mm.
Composition of the consumable electrode, in percent: $C \leq 0.10$; $Mn = 1.40-1.70$; $Si = 0.65-0.85$; $Cr \leq 0.20$; $Ni \leq 0.25$; $S < 0.025$; $P < 0.030$; the rest — Fe.

The operating current of the straight polarity first arc is 1,150 a, the operating current of the straight polarity trailing arc is 980 a, the operating current of the middle arc burning between the consumable electrode and the workpiece (beam) is 850 a.

The distance between the axes of the straight and reversed polarity arcs amounts to 37 mm.

The least ratio of the product of the currents of two adjacent arcs to the distance between their axes is $2.25 \cdot 10^5$ $A^2/cm$.

The speed of welding is 440 m/hr.

The clearance between the welded edges should be within 1–1.5 mm, when some arcs are started between nonconsumable electrodes and the workpiece (beam) and other arcs are started between consumable electrodes and the workpiece (beam).

EXAMPLE 2.

Welding of vessels of a 20 mm thick corrosion-resisting steel. The production process provides for single-welded, one-pass, square butt or bevelled welding of joints. With square butt welding the weld cannot be reinforced.

Composition of the welded material, in percent:
$C < 0.08$; $Cr = 17.0-19.0$; $Ni = 9.0-11.0$; $Si \leq 0.80$; $Mn \leq 1.2$ $S \leq 0.020$; $P \leq 0.035$; The rest — Fe.

Welding of a square butt joint is realized according to the circuit of FIG. 1 and is performed in conditions, when arcs of different polarities are started between the nonconsumable electrodes and the workpiece (vessel). There are three nonconsumable electrodes. The first and trailing arcs have the straight polarity, whereas the middle arc has the reversed polarity.

Argon is used as the plasma-forming gas for arcs of the straight and reversed polarities. Each arc consumes 180 l/hr of the plasma-forming gas.

Argon is also used as the shielding medium and its consumption for this purpose amounts to 1,200 l/hr.

The operating current of the straight polarity first arc is 1,100 A, the operational current of the straight polarity trailing arc is 950 A, the operating current of the reversed polarity middle arc is 730 A.

The distance between the axes of the straight and reversed polarity arcs reaches 37 mm. The least ratio of the product of the current of two adjacent arcs to the distance between the axes is $1.87 \cdot 10^5 A^2/cm$.

The speed of welding is 55 m/hr.

The speed of welding can be increased by 50–60% by employment of a mixture 95% of Ar + 5% of $H_2$ as the plasma-forming gas for the straight polarity arcs. Other parameters of the process remain unchanged.

In case carbon dioxide ($CO_2$) is used as the plasma-forming gas for the straight polarity arcs, the speed of welding can be increased by 1.5–2 times. All other parameters remain the same.

Employment of carbon dioxide as the plasma-forming gas of the straight polarity arcs and as the shielding medium increases the speed of welding by 2–2.5 times, but the appearance of the weld deteriorates. Carbon dioxide can be used as the plasma-forming gas of the straight polarity arcs and as the shielding medium, when no strict requirements are set for the appearance of the weld.

The appearance of the weld can, however, be improved by protecting the weld metal by flux, even though carbon dioxide is used as the plasma-forming gas of the straight polarity arcs. In this case the consumption of the $CO_2$ plasma-forming gas at the first and trailing arcs having the straight polarity can be drastically increased, as well as the depth of fusion, to 20% without changing other parameters of the process.

Acceptable composition of flux for these purposes, in percent:
$SiO_2 = 19.0-24.0$; $MnO \leq 0.5$; $CaO = 3.0-9.0$; $MgO = 9.0-13.0$; $Al_2O_3 = 27.0-32.0$; $Na_2O$ and $K_2O = 2.0-3.0$; $CaF_2 = 25.0-33.0$; $Fe_2O_3 = 1.0$; $S \leq 0.08$; $P \leq 0.05$. The weld joint is formed in this case by fusion of the welded material only.

Welding of a bevelled joint is realized according to the circuit of FIG. 2 and is performed in conditions, when arcs of different polarities are started between the nonconsumable electrodes and the workpiece (vessel) and the consumable electrodes and the workpiece (vessel). There are two nonconsumable electrodes and one consumable electrode.

The arcs between the nonconsumable electrodes and the workpiece (vessel) are of the straight polarity, whereas the arc between the consumable electrode and the workpiece is of the reversed polarity.

The composition of consumption of the plasma-forming gas and the shielding mediums are like those in the square butt welding.

The diameter of the consumable electrode is 5 mm.
Composition of the consumable electrode, in percent:
$C \leq 0.08$; $Mn = 1.0-2.0$; $Si = 0.3-0.8$; $Cr = 18.0-20.0$; $Ni = 9.0-11.0$; $Ti = 0.5-0.8$; $S \leq 0.018$; $P \leq 0.025$; $Mo = = 2.0-3.0$; the rest — Fe.

The operating current of the straight polarity first arc is 1,100 A, the operating current of the straight polarity trailing arc is 950 A, the operating current of the middle arc is 790 A.

The distance between the axes of the straight and reversed polarity arcs amounts to 37 mm.

The least ratio of the product of the current of two adjacent arcs to the distance between the axes is $2.03 \cdot 10^5 A^2/cm$.

The speed of welding is equal to 67 m/hr.

The speed of welding can be increased, if molecular gases or gas mixtures of inert and molecular gases are employed as the plasma-forming gases, as well as if flux is used as the shielding medium.

The speed of welding can be thus increased 4–6 times.

EXAMPLE 3

Welding of crystallizer moulds for vacuum arc and electroslag melting. Operating conditions of moulds for vacuum arc melting require that they are made of chromium copper, whereas moulds for electroslag melting are made of copper. The welded edges are 40 mm thick.

Joints of moulds for vacuum arc melting are welded according to the circuit of FIG. 1 and in conditions, when arcs of different polarities are started between nonconsumable electrodes and the workpiece (mould). There are three nonconsumable electrodes. The first and trailing arcs are of the straight polarity, the middle arc is of the reversed polarity. Square butt welding is employed. The welded material has the following composition, in percent:

Cr = 0.4–0.7; Fe ≦ 0.06; Pb ≦ 0.005; Zn ≦ 0.015; Mn ≦ 0.002; Si ≦ 0.05; P ≦ 0.01; the rest Cu.

Argon is used as the plasma-forming gas for the straight and reversed polarity arcs. Consumption of the plasma-forming gas in each arc amounts to 260 l/hr. The shielding medium is argon and its consumption for shielding purposes is 900 l/hr.

The operating current of the straight polarity first current is 1,100 A, the operating current of the straight polarity trailing arc is 950 A and the operating current of the reversed polarity middle arcs is 730 A.

The distance between the axes of the straight and reversed polarity arcs is 37 mm. The lesser ratio of the product of the currents of two adjacent arcs to the distance between the axes constitutes $1.87 \cdot 10^5$ A$^2$/cm.

The speed of welding is 11.0 m/hr. Nitrogen (N$_2$) can be used as the plasma-forming gas for the straight polarity arcs and as the shielding gas. In this case the speed of welding can be doubled without altering other welding parameters.

It is advisable that a mixture 30% Ar + 70% He is used as the plasma-forming medium for arcs of the straight and reversed polarities, whereas argon is used as the weld shielding. In this case the speed of welding remains high and the quality of joints is improved.

The most vacuum resisting welds can be obtained by employing a mixture 30% Ar + 70% He as the plasma-forming medium for arcs of the straight and reversed polarities and using as the shielding medium the flux of the following composition, in percent:

SiO$_2$ = 3.0–32.0; Al$_2$O$_3$ = 20.0–22.0; MnO = 2.5–3.5; CaF$_2$ = 20.0–24.0; MgO = 16.0–18.0; CaO = 5.0–6.5; FeO$_2$ + Fe$_2$O$_3$ ≦ 1.0; S ≦ 0.15; P ≦ 0.1.

The weld is formed at the expense of the basic (welded) material and a filler material. Consumption of the filler material is minimum considering losses or spatter and other losses. The composition of the filler material corresponds to the basic (welded) material.

Welding of bevel joints of electroslag melting moulds is realized according to the circuit of FIG. 2 and performed in conditions, when arcs of different polarities are started between nonconsumable electrodes and the workpiece (mould) and consumable electrodes and the workpiece (mould). There are two nonconsumable electrodes and one consumable electrode.

The arcs between the nonconsumable electrodes and the workpiece are of the straight polarity and the arc between the consumable electrode and the workpiece is of the reversed polarity.

Compositions and consumptions of the plasma-forming gas and the shielding mediums are like those for welding by three nonconsumable electrodes.

The diameter of the consumable electrode is 5 mm.

Composition of the consumable electrode, in percent:
Si = 3.5; Mn = 1.5; Zn = 1.0; Fe ≦ 0.03; Pb ≦ 0.03; P ≦ 0.05; Ni ≦ 0.1; Bi ≦ 0.002; the rest — Cu.

The operating current of the straight polarity first arc is 1,100 A, the operating current of the straight polarity trailing arc is 950 A and the operating current of the middle arc is 790 A.

The distance between the axes of the arcs of the straight and reversed polarities amounts to 37 mm. The lesser ratio of the product of the currents of two adjacent arcs to the distance between the axes amounts to $2.03 \cdot 10^5$ A$^2$/cm. The speed of welding is equal to 15 m/hr. The speed of welding can be increased, when molecular gases, e.g. N$_2$, or a mixture of inert gases, e.g. Ar+He, are employed as the plasma-forming and shielding mediums, as well as when molecular and inert gases and their mixtures are combined with a flux. In this case the speed of welding can be increased four or six-fold.

EXAMPLE 4

Welding of cryogenic equipment with 30 mm thick edges to be welded. The process is realized according to the circuit of FIG. 3. The composition of the welded material is as follows in percent:

Cu ≦ 0.02; Mg ≦ 0.05; Mn ≦ 0.025; Fe ≦ 0.3; Zn ≦ 0.3; Ti ≦ 0.1; the rest — Al.

The welding is performed in conditions, when arcs of different polarities are started between nonconsumable electrodes and the workpiece. There are three nonconsumable electrodes. The first and trailing arcs are of the reversed polarity and the middle arc is of the straight polarity.

The plasma-forming gas for all arcs is a mixture of argon and helium (Ar+He). Consumption of argon in the mixture is 45 l/hr and consumption of helium in the mixture is 135 l/hr. Argon is also used as the shielding medium. Consumption of argon for shielding the pool is 1,800 l/hr.

The operating current of the reversed polarity first arc is 820 A, the operating current of the reversed polarity trailing arc is 710 A and the operating current of the straight polarity middle arc is 430 A.

The distance between the axes of the arcs of the straight and reversed polarities is 32 mm. The lesser ratio of the product of the currents of two adjacent arcs to the distance between the axes amounts to $2.03 \cdot 10^5$ A$^2$/cm.

The speed of welding is equal to 20 m/hr.

The welded joint is formed by melting the basic metal. The spattering and other losses are compensated by a wire of the following composition, in percent:

Al = 99.97; Fe = 0.015; Si = 0.010; Cu = 0.005.

The speed of welding can be increased by 15–20% by introducing a molecular gas mixed with argon (Ar + O$_2$) into the plasma-forming medium of the straight polarity arc. All other parameters remain the same.

In conditions, when the plasma-forming medium of the straight and reversed polarity arcs is a mixture Ar+He, the weld metal can be shielded by a flux of the following composition, in percent:

KCl = 50; NaCl = 28; LiCl = 14; NaF = 8.

In this case the flux dissolves oxide films and refines the metal, but an additional operation of clearing the remaining flux by warm water is required.

When the plasma-forming medium of arcs of the straight and reversed polarities comprises argon only and the weld is shielded by the flux of the above described composition, better shielding can be achieved by additionally using argon. In this case the layer of the flux can be reduced or it can be applied as a paste of the same composition.

Welding of cryogenic equipment in conditions, when arcs of different polarities are started between nonconsumable electrodes and the workpiece and between consumable electrodes and the workpiece is realized according to the circuit of FIG. 4 and requires bevelled edges. The composition and thickness of the material are analogous to that of welding by nonconsumable electrodes.

There are two nonconsumable electrodes.

There is one consumable electrode.

The nonconsumable electrodes are of the reversed polarity and the consumable electrode is of the straight polarity.

Argon is employed as the plasma-forming gas for the reversed polarity arcs. Consumption of argon is 220 l/hr. Inert shielding medium is used and it consists of argon. Consumption of argon for this purpose is 1,800 l/hr. The operating current of the leading arc is 820 A, the operating current of the trailing arc is 760 A and the operating current of the middle arc is 520 A.

The distance between the axes of the straight and reverse polarity arcs is 32 mm.

The lesser ratio of the product of the currents of two adjacent arcs to the distance between their axes is $1.24 \cdot 10^5$ $A^2/cm$.

The speed of welding is 38 m/hr. The welding joint is formed at the expense of melting the basic metal and the consumable electrode of the identical composition. If a mixture $Ar+He$ is used as the plasma-forming gas, the speed of welding is increased by 30% and all other parameters of the process remain unchanged.

A mixture $Ar+O_2$ or the flux with the above described composition can be employed as the shielding medium. If argon is used as the plasma-forming gas for the reversed polarity arcs and $Ar+O_2$ as the shielding medium, the speed of welding rises and a fine spray metal is transferred between the consumable electrode and the workpiece.

If argon or a mixture $Ar+He$ combined with the flux are used as the plasma-forming gas, oxide-free compounds can be obtained. An additional operation of clearing the remaining flux by washing the workpieces in warm water is required in this case.

What is claimed is:

1. A method of plasma multiarc welding using a common weld pool by permanently burning direct-current arcs of different polarities comprising positioning at least three electrodes adjacent to each other, each of said electrodes being nonconsumable, positioning a workpiece to be welded in spaced relation to said three electrodes, providing a plasma-forming gas and a shielding medium to the space between said three electrodes and said workpiece, providing a direct-current power source across each of said three electrodes and said workpiece simultaneously to create at least three electric arcs, each arc being between one of said three electrodes and the workpiece such that the polarity of each arc is selected to be of straight polarity or of reversed polarity so that the arcs adjacent one another have opposite polarities, wherein the three electrodes positioned adjacent to each other and the direct-current power source provided to said electrodes are set so that the ratio of the product of the currents of two adjacent arcs to the distance between said arcs is greater than or equal to $9.5 \cdot 10^4$ amps squared per centimeter.

2. A method of plasma multiarc welding using a common weld pool by permanently burning direct-current arcs of different polarities comprising positioning at least three electrodes adjacent to each other, each of said electrodes being alternating consumable and nonconsumable, positioning a workpiece to be welded in spaced relation to said three electrodes, providing a plasma-forming gas and a shielding medium to the space between said three electrodes and said workpiece, providing a direct-current power source across each of said three electrodes and said workpiece simultaneously to create at least three electric arcs, each arc being between one of said three electrodes and the workpiece such that the polarity of each arc is selected to be of straight polarity or of reversed polarity so that the arcs adjacent one another have opposite polarities, and such that all consumable electrodes have the same polarity and all nonconsumable electrodes have the opposite polarity, wherein the three electrodes positioned adjacent to each other and the direct-current power source provided to said electrodes are set so that the ratio of the product of the currents of two adjacent arcs to the distance between said arcs is greater than or equal to $9.5 \cdot 10^4$ amps squared per centimeter.

3. A method of welding low-alloy steels as claimed in claim 1, wherein carbon dioxide is used as the plasma-forming and shielding gas for the straight polarity arcs and argon is used for the reversed polarity arcs.

4. A method of welding low-alloy steel as claimed in claim 1, wherein a mixture $CO_2+O_2$ is used as the plasma-forming gas for the straight polarity arcs, $CO_2$ is used in the shielding medium and argon for the reversed polarity arcs.

5. A method of welding stainless steels as claimed in claim 1, wherein a mixture $Ar+H_2$ is used as the plasma-forming gas for the straight polarity arcs and argon is used for the reversed polarity arcs and in the shielding medium.

6. A method of welding stainless steels as claimed in claim 1, wherein $CO_2$ is used as the plasma-forming gas for the straight polarity arcs, argon is used for the reversed polarity arcs and $CO_2$ is used in the shielding medium.

7. A method of welding low-alloys and stainless steels as claimed in claim 1, wherein $CO_2$ is used as the plasma-forming gas for the straight polarity arcs, argon is used for the reversed polarity arcs and a flux is used as the shielding medium.

8. A method of welding copper as claimed in claim 1, wherein $N_2$ is used as the plasma-forming gas for the straight polarity arcs and in the shielding medium and argon is used for the reversed polarity arcs.

9. A method of welding copper and aluminum as claimed in claim 1, wherein a mixture $Ar+He$ is used for the straight and reversed polarity arcs as the plasma-forming gas and argon is used in the shielding medium.

10. A method of welding copper and aluminum as claimed in claim 1, wherein a mixture $Ar+He$ is used as the plasma-forming gas for the straight and reversed polarity arcs and a flux is used in the shielding medium.

11. A method of welding aluminum as claimed in claim 1, wherein a mixture $Ar+O_2$ is used as the plasma-forming gas for the straight polarity arcs, and wherein argon is used for the reversed polarity arcs and in the shielding medium.

12. A method of welding aluminum as claimed in claim 1, wherein argon is used as the plasma-forming gas for the straight and reversed polarity arcs, and wherein argon and a flux are used as the shielding medium.

13. A method of welding low-alloy steels as claimed in claim 2, wherein $CO_2$ is used in the shielding medium and as the plasma-forming gas for consumable and nonconsumable straight polarity electrodes.

14. A method of welding low-alloy steels as claimed in claim 2, wherein a mixture $CO_2+O_2$ is used as the plasma-forming gas for the straight polarity arcs and $CO_2$ is used in the shielding medium when consumable reversed polarity electrodes are employed.

15. A method of welding stainless steels as claimed in claim 2, wherein a mixture $Ar+H_2$ is used as the plasma-forming gas for the straight polarity arcs and argon is used in the shielding medium when consumable reversed polarity electrodes and nonconsumable straight polarity electrodes are employed.

16. A method of welding stainless steels as claimed in claim 2, wherein $CO_2$ is used as the plasma-forming gas for the straight polarity arcs and in the shielding medium when consumable reversed polarity electrodes and nonconsumable straight polarity electrodes are employed.

17. A method of welding stainless and low-alloy steels as claimed in claim 2, wherein $CO_2$ is used as the plasma-forming gas for the straight polarity arcs and a flux is used in the shielding medium when consumable reversed polarity electrodes and nonconsumable straight polarity electrodes are employed.

18. A method of welding copper as claimed in claim 2, wherein $N_2$ is used as the plasma-forming gas for the straight polarity arcs and in the shielding medium when consumable reversed polarity electrodes and nonconsumable straight polarity electrodes are employed.

19. A method of welding copper as claimed in claim 2, wherein a mixture $Ar+He$ is used as the plasma-forming gas for the straight polarity arcs and argon is used in the shielding medium when consumable reversed polarity electrodes and nonconsumable straight polarity electrodes are employed.

20. A method of welding copper as claimed in claim 2, wherein a mixture $Ar+He$ is used as the plasma-forming gas for the straight polarity arcs and a flux is used in the shielding medium when consumable reversed polarity electrodes and nonconsumable straight polarity electrodes are employed.

21. A method of plasma multiarc welding as claimed in claim 2, wherein the workpiece to be welded is aluminum and wherein a mixture $Ar+He$ is used as the plasma-forming gas for the reversed polarity arcs and argon is used in the shielding medium when consumable straight polarity electrodes and nonconsumable reversed polarity electrodes are employed.

22. A method of plasma multiarc welding as claimed in claim 2, wherein the workpiece to be welded is aluminum and wherein argon is used as the plasma-forming gas for the reversed polarity arcs and a mixture $Ar+O_2$ is used in the shilding medium when consumable straight polarity electrodes and nonconsumable reversed polarity electrodes are employed.

23. A method of plasma multiarc welding as claimed in claim 2, wherein the workpiece to be welded is aluminum and wherein a mixture $Ar+He$ is used as the plasma-forming gas for the reversed polarity arcs and a flux is used in the shielding medium when consumable straight polarity electrodes and nonconsumable reversed polarity electrodes are employed.

24. A method of plasma multiarc welding as claimed in claim 2, wherein the workpiece to be welded is aluminum and wherein argon is used as the plasma-forming gas for the reversed polarity arcs and wherein argon and a flux is used as the shielding gas when consumable straight polarity electrodes and nonconsumable reversed polarity electrodes are employed.

* * * * *